(12) United States Patent
Tajima

(10) Patent No.: US 10,308,746 B2
(45) Date of Patent: Jun. 4, 2019

(54) CONJUGATED DIENE POLYMER AND CONJUGATED DIENE POLYMER COMPOSITION

(71) Applicant: SUMITOMO CHEMICAL COMPANY, LIMITED, Tokyo (JP)

(72) Inventor: Koichiro Tajima, Pittsburgh, PA (US)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

(21) Appl. No.: 15/509,731

(22) PCT Filed: Sep. 9, 2015

(86) PCT No.: PCT/JP2015/075616
§ 371 (c)(1),
(2) Date: Mar. 8, 2017

(87) PCT Pub. No.: WO2016/039381
PCT Pub. Date: Mar. 17, 2016

(65) Prior Publication Data
US 2017/0267800 A1    Sep. 21, 2017

(30) Foreign Application Priority Data

Sep. 10, 2014  (JP) ................................. 2014-183905

(51) Int. Cl.
| | | |
|---|---|---|
| *C08F 232/06* | (2006.01) | |
| *C08F 236/04* | (2006.01) | |
| *C08F 8/00* | (2006.01) | |
| *C08L 9/00* | (2006.01) | |
| *C08L 15/00* | (2006.01) | |
| *C08K 13/02* | (2006.01) | |
| *C08C 19/22* | (2006.01) | |
| *C08C 19/25* | (2006.01) | |
| *C08C 19/44* | (2006.01) | |
| *C08F 236/06* | (2006.01) | |
| *C08F 236/08* | (2006.01) | |

(52) U.S. Cl.
CPC ............ *C08F 232/06* (2013.01); *C08C 19/22* (2013.01); *C08C 19/25* (2013.01); *C08C 19/44* (2013.01); *C08F 8/00* (2013.01); *C08F 236/04* (2013.01); *C08F 236/06* (2013.01); *C08F 236/08* (2013.01); *C08K 13/02* (2013.01); *C08L 9/00* (2013.01); *C08L 15/00* (2013.01)

(58) Field of Classification Search
CPC .... C08F 232/06; C08F 236/08; C08F 236/06; C08F 8/00; C08F 236/04; C08K 13/02; C08C 19/44; C08C 19/25; C08C 19/22; C08L 15/00; C08L 9/00
See application file for complete search history.

(56) References Cited

U.S. PATENT DOCUMENTS

| | | | |
|---|---|---|---|
| 2003/0220437 A1* | 11/2003 | Hopkins | .................. C08K 3/36 524/492 |
| 2004/0044202 A1 | 3/2004 | Halasa et al. | |
| 2004/0209993 A1 | 10/2004 | Manders et al. | |
| 2004/0249057 A1 | 12/2004 | Manders et al. | |
| 2005/0043440 A1* | 2/2005 | Resendes | .............. C08F 210/12 523/201 |
| 2012/0190771 A1 | 7/2012 | Ito et al. | |
| 2013/0035443 A1* | 2/2013 | Yan | ..................... C08F 293/005 525/105 |

FOREIGN PATENT DOCUMENTS

| | | |
|---|---|---|
| CN | 102603975 A | 7/2012 |
| JP | 57185307 A | 11/1982 |
| JP | 57200403 A | 12/1982 |
| JP | 62050346 A | 3/1987 |
| JP | 07292162 A | 11/1995 |

OTHER PUBLICATIONS

L. H. Sperling, "Introduction to Physical Polymer Science", John Wiley & Sons, Inc, New York, New York, pp. 78-79, (1992).*
English langauge translation of JP 62-050346, pp. 1-3, Apr. 30, 2018.*
International Preliminary Report on Patentability with translation of Written Opinion dated Mar. 23, 2017, issued by the International Searching Authority in application No. PCT/JP2015/075616.
International Search Report, issued by International Searching Authority in International Application No. PCT/JP2015/075616, dated Dec. 15, 2015.
Communication dated Apr. 11, 2018 from the European Patent Office in counterpart European application No. 15839270.4.
Communication dated Jul. 18, 2018 from the State Intellectual Property Office of the P.R.C. in counterpart application No. 201580048419.7.
Second Office Action dated Feb. 22, 2019, issued by the National Intellectual Property Administration of P.R. China in Application No. 201580048419.7.

* cited by examiner

*Primary Examiner* — Alexander C Kollias
(74) *Attorney, Agent, or Firm* — Sughrue Mion, PLLC

(57) ABSTRACT

Disclosed is a conjugated diene polymer comprising a conjugated diene as a monomeric unit. The conjugated diene polymer is obtained by a polymerization reaction in a reaction solution comprising a conjugated diene, at least one compound selected from the group consisting of limonene, terpinene, and terpinolene, and an organoalkali metal compound as a polymerization initiator. $Mz/Mn$ is 1.7 or more and 4.0 or less, when $Mz$ is a Z-average molecular weight of the conjugated diene polymer, $Mn$ is a number average molecular weight of the conjugated diene polymer, and the Z-average molecular weight and the number average molecular weight are values in terms of polystyrene by gel permeation chromatography.

4 Claims, No Drawings

CONJUGATED DIENE POLYMER AND CONJUGATED DIENE POLYMER COMPOSITION

CROSS REFERENCE TO RELATED APPLICATIONS

This application is a National Stage of International Application No. PCT/JP2015/075616, filed on Sep. 2015, which claims priority from Japanese Patent Application No. 2014-183905, filed on Sep. 10, 2014, the contents of all of which are incorporated herein by reference in their entirety.

TECHNICAL FIELD

The present invention relates to a conjugated diene polymer capable of providing a conjugated diene polymer composition having excellent durability, and a conjugated diene polymer composition containing the conjugated diene polymer.

BACKGROUND ART

Required properties of automobile tires include fuel efficiency, durability, gription, and the like. As polymer compositions used for automobile tires to increase these properties, many conjugated diene polymer compositions have been proposed that contain a conjugated diene polymer such as polybutadiene or a styrene-butadiene copolymer, and a reinforcing agent.

For example, Patent Literature 1 proposes a polymer composition in which silica as a reinforcing agent is added to a polymer obtained by homopolymerizing butadiene or copolymerizing butadiene and styrene in a hydrocarbon solvent using n-butyllithium as a polymerization initiator. Patent Literature 2 proposes a polymer composition in which silica and carbon black as reinforcing agents are added to a polymer obtained by copolymerizing butadiene and styrene in a hydrocarbon solvent using n-butyllithium as a polymerization initiator.

CITATION LIST

Patent Literature

Patent Literature 1: Japanese Unexamined Patent Publication No. S62-50346
Patent Literature 2: Japanese Unexamined Patent Publication No. H7-292162

SUMMARY OF INVENTION

Technical Problem

However, even when the polymers obtained by copolymerizing butadiene and styrene described in these patent literatures are used, the durability of polymer compositions thereof is not necessarily satisfactory.

Under this circumstance, an object of the present invention is to provide a conjugated diene polymer capable of providing a conjugated diene polymer composition having excellent durability, and a conjugated diene polymer composition containing the conjugated diene polymer.

Solution to Problem

One aspect of the present invention relates to a conjugated diene polymer comprising a conjugated diene as a monomeric unit. The conjugated diene polymer is obtained by a polymerization reaction in a polymerization solution comprising the conjugated diene, at least one compound selected from the group consisting of limonene, terpinene, and terpinolene, and an organoalkali metal compound as a polymerization initiator. When Mz is a Z-average molecular weight of the conjugated diene polymer, Mn is a number average molecular weight of the conjugated diene polymer, and the Z-average molecular weight and the number average molecular weight are values in terms of (standard) polystyrene by gel permeation chromatography, Mz/Mn is 1.7 or more and 4.0 or less.

The conjugated diene polymer may be a polymer obtained by polymerizing a conjugated diene or copolymerizing a conjugated diene and a comonomer in a hydrocarbon solution comprising at least one compound selected from the group consisting of limonene, terpinene, and terpinolene using an organoalkali metal compound as a polymerization initiator.

Another aspect of the present invention relates to a conjugated diene polymer composition comprising the above conjugated diene polymer and a reinforcing agent, a content of the reinforcing agent being 10 parts by mass or more and 150 parts by mass or less based on 100 parts by mass of the content of the conjugated diene polymer.

Advantageous Effects of Invention

According to the present invention, a conjugated diene polymer capable of providing a conjugated diene polymer composition having excellent durability and a conjugated diene polymer composition containing the conjugated diene polymer can be obtained.

DESCRIPTION OF EMBODIMENTS

Some embodiments of the present invention will be described in detail hereinafter. However, the present invention is not limited to the following embodiments.

The conjugated diene polymer according to one embodiment contains a monomeric unit derived from a conjugated diene and may further contain a monomeric unit derived from a comonomer other than the conjugated diene.

The conjugated diene constituting the conjugated diene polymer may contain at least one selected from the group consisting of, for example, 1,3-butadiene, isoprene, 1,3-pentadiene, 2,3-dimethyl-1,3-butadiene, and 1,3-hexadiene. The conjugated diene may contain 1,3-butadiene and/or isoprene.

The comonomer constituting the conjugated diene polymer may contain at least one selected from the group consisting of, for example, aromatic vinyl compounds such as styrene, α-methylstyrene, vinyltoluene, vinylnaphthalene, divinylbenzene, trivinylbenzene, and divinylnaphthalene. The comonomer may contain styrene.

The conjugated diene polymer according to one embodiment can be obtained by, for example, a polymerization reaction in a polymerization solution (a hydrocarbon solution) containing a conjugated diene, at least one compound selected from the group consisting of limonene, terpinene, and terpinolene, and an organoalkali metal compound as a polymerization initiator. According to the findings of the present inventors, the conjugated diene polymer obtained by a polymerization reaction in a polymerization solution containing at least one compound selected from the group consisting of limonene, terpinene, and terpinolene, and an organoalkali metal compound is capable of providing a conjugated diene polymer composition having better durability than the conjugated diene polymer obtained by a polymerization reaction in a polymerization solution not containing the at least one compound selected from the group consisting of limonene, terpinene, and terpinolene.

Limonene can be selected from isomers such as α-limonene and β-limonene, and may be any of a D form, an L form, or a racemic form. Terpinene can be selected from isomers such as α-terpinene, β-terpinene, and γ-terpinene. Terpinolene can be selected from isomers such as α-terpinolene. When simply referred to as "limonene", "terpinene", or "terpinolene", typically an a form is meant.

The total content of limonene, terpinene, and terpinolene in a polymerization solution (or a hydrocarbon solution) may be 0.5 mol or more and 40 mol or less, 0.6 mol or more and 37 mol or less, 0.8 mol or more and 35 mol or less, or 1 mol or more and 30 mol or less, per 1 mol of the alkali metal of the organoalkali metal compound. The upper limits and the lower limits of these numerical ranges can be in any combination. The conjugated diene polymer according to some embodiments can contain a monomeric unit derived from limonene, terpinene, or terpinolene.

Examples of the organoalkali metal compound include ethyllithium, n-propyllithium, iso-propyllithium, n-butyllithium, sec-butyllithium, tert-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, tert-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, potassium naphthalenide, and a reaction product of 3-(dimethylamino) propyllithium and isoprene (a compound obtained by reacting 3-(dimethylamino)propyllithium and isoprene). The organoalkali metal compound may be an organolithium compound and/or an organosodium compound, or may be an organolithium compound having 2 or more and 20 or less carbon atoms and/or an organosodium compound having 2 or more and 20 or less carbon atoms.

The organoalkali metal compound as a polymerization initiator may be supplied to a polymerization reactor (a polymerization solution) at once at the beginning of polymerization, or may be supplied in a divided or continuous manner during the polymerization reaction. By supplying the organoalkali metal compound in a divided or continuous manner, the molecular weight distribution can be regulated. Here, "supplying the organoalkali metal compound in a divided manner" means that the total amount of the organoalkali metal compound used for the polymerization reaction is supplied in 2 or more divided portions. "Supplying the organoalkali metal compound in a continuous manner" means that the organoalkali metal compound used for the polymerization reaction is continuously supplied at a predetermined supply rate while allowing the polymerization reaction to proceed. Specifically, for example, the organoalkali metal compound may be supplied to a polymerization solution over a period of 10 minutes to 5 hours while allowing the polymerization reaction to proceed. The organoalkali metal compound supplied to the polymerization solution may be in the state of a solution in which the organoalkali metal compound is dissolved in a solvent such as a hydrocarbon.

The total amount of the organoalkali metal compound used for the polymerization reaction may be 0.5 mmol or more, 0.67 mmol or more, or 0.77 mmol or more, and may be 0.46 mol or less, or 0.23 mol or less, based on 1 kg of the conjugated diene.

The solvent contained in the polymerization solution (the hydrocarbon solution) above may be a solvent that does not substantially deactivate the organoalkali metal compound used as a polymerization initiator. Examples of the solvent include aliphatic hydrocarbons such as propane, butane, isobutane, pentane, isopentane, and hexane; aromatic hydrocarbons such as benzene, toluene, xylene, and ethylbenzene; and alicyclic hydrocarbons such as cyclopentane and cyclohexane. Two or more solvents selected from these may be used in combination.

The polymerization solution (the hydrocarbon solution) may contain an agent that regulates the amount of vinyl bonds of the monomeric unit derived from the conjugated diene, and an agent that regulates the distribution of the monomeric unit derived from the conjugated diene in the conjugated diene polymer (hereinafter collectively referred to as a "regulator").

Examples of the regulator include ether compounds, tertiary amines, phosphine compounds, alkali metal alkoxides, and alkali metal phenoxides. Examples of the ether compounds include:

cyclic ethers such as tetrahydrofuran, tetrahydropyran, and 1,4-dioxane; aliphatic monoethers such as diethyl ether and dibutyl ether;

aliphatic diethers such as ethylene glycol dimethyl ether, ethylene glycol diethyl ether, and ethylene glycol dibutyl ether;

aliphatic triethers such as diethylene glycol diethyl ether and diethylene glycol dibutyl ether; and aromatic ethers such as diphenyl ether and anisole. Examples of the tertiary amines include triethylamine, tripropylamine, tributylamine, 1,1,2,2-tetramethylethylenediamine, N,N-diethylaniline, pyridine, and quinoline. Examples of the phosphine compounds include trimethyl phosphine, triethyl phosphine, and triphenyl phosphine. Examples of the alkali metal alkoxides include sodium-tert-butoxide, potassium-tert-butoxide, sodium-tert-pentoxide, and potassium-tert-pentoxide. Examples of the alkali metal phenoxides include sodium phenoxide and potassium phenoxide. Two or more regulators selected from these may be used in combination.

The content of monomeric component in the polymerization solution (the hydrocarbon solution) may be 1 mass % or more and 50 mass % or less, or 5 mass % or more and 30 mass % or less. Note that the total amount of the polymerization solution is 100 mass %. When the polymerization solution solely contains a conjugated diene as a monomeric component, the content of monomeric component in the hydrocarbon solution is the content of the conjugated diene. When the polymerization solution contains a conjugated diene and a comonomer as monomeric components, the content of monomeric component in the polymerization solution is the sum of the contents of the conjugated diene and the comonomer. Although limonene, terpinene, and terpinolene can copolymerize with the conjugated diene, the amount thereof is not included in the content of monomeric component.

The polymerization temperature (the temperature of the polymerization solution) may be 25° C. or higher and 100° C. or lower, 35° C. or higher and 90° C. or lower, or 50° C. or higher and 80° C. or lower. The polymerization time may be 10 minutes or longer and 5 hours or shorter.

During polymerization or after polymerization, the polymerization active terminal of the conjugated diene polymer may be reacted with at least one compound selected from the group consisting of alkoxysilane compounds, halogen-containing silicon compounds, ketone compounds, and tin compounds to modify the conjugated diene polymer. This reaction provides a conjugated diene copolymer having a modifying group that is bonded to the molecular chain terminal and derived from an alkoxysilane compound, a halogen-containing silicon compound, a ketone compound, or a tin compound.

Examples of the alkoxysilane compound include: [(dialkylamino)alkyl]alkoxysilane compounds such as [3-(dimethylamino)propyl]triethoxysilane, [3-(dimethylamino)propyl]trimethoxysilane, [3-(diethylamino)propyl]triethoxysilane, [3-(diethylamino)propyl]trimethoxysilane, [3-(dimethylamino)propyl]methyldiethoxysilane, [2-(dimethylamino)ethyl]triethoxysilane, and [2-(dimethylamino)ethyl]trimethoxysilane; cyclic aminoalkylalkoxysilane compounds such as (1-hexamethyleneiminomethyl)trimethoxysilane, [3-(1-hexamethyleneimino)propyl]triethoxysilane, N-(3-triethoxysilylpropyl)-4,5-dihydroimidazole, and N-(3-trimethoxysilylpropyl)-4,5-imidazole; {[di(tetrahydrofuranyl)amino]alkyl}alkoxysilane compounds such as {3-[di(tetrahydrofuranyl)amino]propyl}trimethoxysilane and {3-[di(tetrahydrofuranyl)amino]propyl}triethoxysilane; and [N,N-bis(trialkylsilyl)aminoalkyl]alkylalkoxysilane compounds such as {3-[N,N-bis(trimethylsilyl)amino]propyl}methyldimethoxysilane and {3-[N,N-bis(trimethylsilyl)amino]propyl}methyldiethoxysilane.

Examples of the halogen-containing silicon compound include silicon tetrachloride, methyltrichlorosilane, dimethyldichlorosilane, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

Examples of the ketone compound include: N,N-dihydrocarvylacetamides such as N,N-dimethylacetamide, N,N-diethylacetamide, and N-methyl-N-ethylacetamide; N,N-dihydrocarvylacrylamides such as N-dimethylacrylamide, N,N-diethylacrylamide, and N-methyl-N-ethylacrylamide; N,N-dihydrocarvylmethacrylamides such as N,N-dimethylmethacrylamide, N,N-diethylmethacrylamide, and N-methyl-N-ethylmethacrylamide; 4-(N,N-dihydrocarvylamino)acetophenones such as 4-(N,N-dimethylamino)acetophenone, 4-(N-methyl-N-ethylamino)acetophenone, and 4-(N,N-diethylamino)acetophenone; 4-cyclic aminoacetophenone compounds such as 4'-(imidazol-1-yl)acetophenone; bis(dihydrocarvylaminoalkyl)ketones such as 1,7-bis(methylethylamino)-4-heptanone and 1,3-bis(diphenylamino)-2-propanone; 4-(dihydrocarvylamino)benzophenones such as 4-N,N-dimethylaminobenzophenone, 4-N,N-diethylaminobenzophenone, 4-N,N-di-t-butylaminobenzophenone, and 4-N,N-diphenylaminobenzophenone; and 4,4'-bis(dihydrocarvylamino)benzophenones such as 4,4'-bis(dimethylamino)benzophenone, 4,4'-bis(diethylamino)benzophenone, and 4,4'-bis(diphenylamino)benzophenone.

Examples of the tin compound include tin tetrachloride, methyltrichlorotin, and dimethyldichlorotin.

During polymerization or after polymerization, the polymerization active terminal of the conjugated diene polymer may be treated with alcohol such as methanol, isopropyl alcohol, or 1-butanol. By treating the polymerization active terminal of the conjugated diene polymer with alcohol during polymerization to partially deactivate the polymerization active terminal of the conjugated diene polymer, the molecular weight distribution of the conjugated diene polymer can be regulated.

After polymerization, the conjugated diene polymer can be recovered by a known method from the solution in which the conjugated diene polymer is dissolved. Examples of the method for recovering the conjugated diene polymer include (a) a method in which a coagulant is added to the solution containing the conjugated diene polymer, and (b) a method in which steam is blown into the solution containing the conjugated diene polymer. The recovered conjugated diene polymer may be dried with a known dryer such as a band dryer or an extrusion dryer.

When the conjugated diene polymer is a polymer obtained by copolymerizing a conjugated diene and a comonomer, the content of the monomeric unit derived from the comonomer in the conjugated diene polymer may be 5 mass % or more or 10 mass % or more based on the total amount of the monomer unit derived from the conjugated diene and the monomer unit derived from the comonomer being 100 mass %. The content of the monomeric unit derived from the comonomer in the conjugated diene polymer may be 50 mass % or less or 45 mass % or less.

The Mooney viscosity ($ML_{1+4}$) of the conjugated diene polymer may be 10 or more, or 20 or more, for increased tensile strength at break. The Mooney viscosity of the conjugated diene polymer may be 200 or less, or 150 or less, for increased processability. The Mooney viscosity ($ML_{1+4}$) is measured at 100° C. in accordance with JIS K 6300 (1994). The characters of ($ML_{1+4}$) have the following meanings.

M: Mooney viscosity
L: Use of a large rotor
1+4: Value measured when a sample is heated for 1 minute, and then a rotor is rotated at 2 rpm for 4 minutes The weight average molecular weight (Mw) of the conjugated diene polymer in terms of (standard) polystyrene by gel permeation chromatography may be 10000 or more, 50000 or more, or 100000 or more for increased tensile strength at break. The weight average molecular weight may be 2000000 or less, 1500000 or less, or 1300000 or less for increased processability.

The ratio (Mz/Mn, molecular weight distribution) of the Z-average molecular weight (Mz) to the number average molecular weight (Mn) of the conjugated diene polymer in terms of (standard) polystyrene by gel permeation chromatography is 1.7 or more for increased tensile strength at break. From the same viewpoint, Mz/Mn may be 1.8 or more, or 1.9 or more. Mz/Mn is 4.0 or less for increased tensile elongation at break. From the same viewpoint, Mz/Mn may be 3.8 or less, or 3.5 or less. The upper limits and the lower limits of these numerical ranges can be in any combination.

Mz/Mn can be regulated by, for example, at least one method selected from supplying the organoalkali metal compound to a polymerization reactor (a polymerization solution) in a divided or continuous manner, supplying alcohol to the polymerization reactor during polymerization, and/or modifying the polymerization active terminal of the conjugated diene polymer during polymerization or after polymerization. For example, when the organoalkali metal compound is supplied to the polymerization solution in a divided or continuous manner, the supply rate (for example, the amount supplied per unit time) of the organoalkali metal compound can be determined such that the Mz/Mn of the produced conjugated diene polymer is 1.7 or more and 4.0 or less.

The amount of vinyl bonds in the conjugated diene polymer may be 80 mol % or less or 70 mol % or less based on the content of the monomeric unit derived from the conjugated diene being 100 mol %. The amount of vinyl bonds may be 10 mol % or more, 15 mol % or more, 20 mol % or more, or 30 mol % or more. The amount of vinyl bonds can be determined based on absorption intensity in the vicinity of 910 cm$^{-1}$, which is the absorption peak of a vinyl group, by infrared spectroscopy.

A further polymeric component, an additive, and the like may be added to the conjugated diene polymer, and vulcanization treatment may be performed as necessary, to prepare a conjugated diene polymer composition that contains the conjugated diene polymer and that may contain a further polymer component and/or an additive. The conjugated diene polymer composition may contain two or more conjugated diene polymers according to the above-described embodiment.

Examples of the further polymeric component include butyl rubber, natural rubber, ethylene-propylene copolymers, and ethylene-octene copolymers. Two or more selected from these polymeric components may be used in combination.

When the conjugated diene polymer composition contains a further polymeric component (when a further polymeric component is added to the conjugated diene polymer), the content of the conjugated diene polymer in the conjugated diene polymer composition may be 10 mass % or more and 99.9 mass % or less, or 20 mass % or more and 90 mass % or less, based on the sum of the contents of the conjugated diene polymer and the further polymeric component being 100 mass %, for increased tensile properties.

The additive used can be a known additive. Examples of the additive include:
vulcanizing agents such as sulfur,
vulcanization accelerators such as thiazole vulcanization accelerators, thiuram vulcanization accelerators, sulfenamide vulcanization accelerators, and guanidine vulcanization accelerators;
vulcanization activators such as stearic acid and zinc oxide;
organic peroxides such as dicumyl peroxide and di-tertiary-butyl peroxide;
reinforcing agents such as silica and carbon black;
fillers such as calcium carbonate, talc, alumina, clay, aluminum hydroxide, and mica;
silane coupling agents; extender oils; processing aids; anti-aging agents; and lubricants.

The vulcanizing agent may be sulfur. Examples of sulfur include powdery sulfur, precipitated sulfur, colloidal sulfur, insoluble sulfur, and highly dispersive sulfur. When the conjugated diene polymer composition contains sulfur (when sulfur is added to the conjugated diene polymer), the sulfur content may be 0.1 parts by mass or more and 15 parts by mass or less, 0.3 parts by mass or more and 10 parts by mass or less, or 0.5 parts by mass or more and 5 parts by mass or less, based on 100 parts by mass of the conjugated diene polymer.

Examples of the vulcanization accelerators include:
thiazole vulcanization accelerators such as 2-mercaptobenzothiazole, dibenzothiazyl disulfide, and N-cyclohexyl-2-benzothiazylsulfenamide;
thiuram vulcanization accelerators such as tetramethylthiuram monosulfide and tetramethylthiuram disulfide;
sulfenamide vulcanization accelerators such as N-cyclohexyl-2-benzothiazole sulfenamide, N-tert-butyl-2-benzothiazole sulfenamide, N-oxymethylene-2-benzothiazole sulfenamide, N-oxyethylene-2-benzothiazole sulfenamide, and N,N'-diisopropyl-2-benzothiazole sulfenamide; and
guanidine vulcanization accelerators such as diphenylguanidine, di-ortho-tolylguanidine, and ortho-tolylbiguanidine.

When the conjugated diene polymer composition contains a vulcanization accelerator (when a vulcanization accelerator is added to the conjugated diene polymer), the content of the vulcanization accelerator may be 0.1 parts by mass or more and 5 parts by mass or less, or 0.2 parts by mass or more and 3 parts by mass or less, based on 100 parts by mass of the conjugated diene polymer.

The reinforcing agent may be at least one selected from the group consisting of, for example, silica, calcium silicate, aluminum silicate, and carbon black.

Examples of silica include dry silica (anhydrous silicic acid), wet silica (hydrous silicic acid), colloidal silica, and precipitated silica. One or two or more types of silica selected from these can be used.

The BET specific surface area of silica may be 50 m$^2$/g or more and 250 m$^2$/g or less. The BET specific surface area is measured in accordance with ASTM D1993-03. As for commercially available silica, trade name Ultrasil VN3-G manufactured by Degussa, trade names VN3, AQ, ER, and RS-150 manufactured by Tosoh Silica Corporation, and trade names Zeosil 1115 MP and 1165 MP manufactured by Rhodia, and the like can be used.

Carbon blacks include furnace black, acetylene black, thermal black, channel black, graphite, and the like. Examples of the carbon black include:
channel carbon black such as EPC, MPC, and CC;
furnace carbon black such as SAF, ISAF, HAF, MAF, FEF, SRF, GPF, APF, FF, CF, SCF, and ECF;
thermal carbon black such as FT and MT; and acetylene carbon black. Two or more carbon blacks selected from these may be used in combination.

The nitrogen adsorption specific surface area ($N_2SA$) of the carbon black may be 5 m$^2$/g or more and 200 m$^2$/g or less. The amount of dibutyl phthalate (DBP) absorption of the carbon black may be 5 ml/100 g or more and 300 ml/100 g or less. The nitrogen adsorption specific surface area is measured in accordance with ASTM D4820-93. The amount of DBP absorption is measured in accordance with ASTM D2414-93. As for commercially available carbon blacks, trade name Diablack N339 manufactured by Mitsubishi Chemical Corporation, trade names Seast 6, Seast 7HM, and Seast KH manufactured by Tokai Carbon Co., Ltd., and trade names CK3 and Special Black 4A manufactured by Degussa, and the like can be used.

When the conjugated diene polymer composition contains a reinforcing agent (when a reinforcing agent is added to the conjugated diene polymer), the content of the reinforcing agent in the conjugated diene polymer composition may be 10 parts by mass or more, 20 parts by mass or more, or 30 parts by mass or more, based on 100 parts by mass of the conjugated diene polymer, for increased tensile strength at break. The content of the reinforcing agent may be 150 parts by mass or less, 120 parts by mass or less, or 100 parts by mass or less for increased tensile elongation at break.

Examples of the silane coupling agent include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide, and γ-trimethoxysilylpropylbenzothiazyl tetrasulfide. One, two or more selected from these can be used. As for commercially available silane coupling agents, trade names Si69 and Si75 manufactured by Degussa and the like can be used.

When the conjugated diene polymer composition contains a silane coupling agent and silica (when a silane coupling agent and silica are added to the conjugated diene polymer), the content of the silane coupling agent may be 1 part by mass or more and 20 parts by mass or less, 2 parts by mass or more and 15 parts by mass or less, or 5 parts by mass or more and 10 parts by mass or less, based on 100 parts by mass of silica.

Examples of the extender oil include aromatic mineral oil (viscosity-gravity constant (V.G.C. value) 0.900 to 1.049), naphthenic mineral oil (viscosity-gravity constant (V.G.C. value) 0.850 to 0.899), and paraffinic mineral oil (viscosity-gravity constant (V.G.C. value) 0.790 to 0.849). The content of the polycyclic aromatic in the extender oil may be less than 3 mass % or less than 1 mass % based on 100 mass % of the extender oil. The content of the polycyclic aromatic is measured in accordance with the UK Institute of Petroleum 346/92 method. The content of aromatic compound (CA) of the extender oil may be 20 mass % or more. One or two or more extender oils selected from these may be used.

As a method for manufacturing a conjugated diene polymer composition by adding a further polymeric component, an additive, and the like to the conjugated diene polymer, for example, a method in which the components are kneaded by a known mixer such as a roll or a Banbury mixer can be used.

When additives other than a vulcanizing agent and a vulcanization accelerator are added, the kneading temperature is normally 50° C. or higher and 200° C. or lower, and may be 80° C. or higher 190° C. or lower, and the kneading time is normally 30 seconds or longer and 30 minutes or shorter, and may be 1 minute or longer and 30 minutes or shorter. When a vulcanizing agent and a vulcanization accelerator are added, the kneading temperature is normally 100° C. or lower, and may be room temperature or higher and 80° C. or lower. Vulcanization treatment such as press vulcanization is normally performed on the conjugated diene polymer composition containing a vulcanizing agent and a vulcanization accelerator. The vulcanization temperature is normally 120° C. or higher and 200° C. or lower, and may be 140° C. or higher and 180° C. or lower.

The conjugated diene polymer composition of the present embodiment has excellent durability and good processability and is suitably used for tires.

EXAMPLES

Physical properties were evaluated by the following methods.

1. Mooney Viscosity ($ML_{1+4}$)

The Mooney viscosity of a polymer was measured at 100° C. in accordance with JIS K 6300 (1994).

2. Molecular Weight Distribution (Mz/Mn)

The molecular weight distribution of a polymer was measured by gel permeation chromatography (GPC) under the following conditions (1) to (8).

(1) Apparatus: HLC-8020 manufactured by Tosoh Corporation
(2) Separation columns: GMH-XL (two columns in series) manufactured by Tosoh Corporation
(3) Measurement temperature: 40° C.
(4) Carrier: Tetrahydrofuran
(5) Flow rate: 0.6 mL/min
(6) Injection amount: 5 μL
(7) Detector: Differential refractometer
(8) Molecular weight standard: Standard polystyrene 3. Amount of Vinyl Bonds (Unit: Mol %)

The amount of vinyl bonds in the monomer derived from 1,3-butadiene in a polymer was obtained based on absorption intensity in the vicinity of 910 $cm^{-1}$, which is the absorption peak of a vinyl group, by infrared spectroscopy.

4. Content of Monomeric Unit Derived from Styrene (Unit: Mass %)

The content of the monomeric unit derived from styrene (the amount of styrene unit) in a polymer was obtained from a refractive index in accordance with JIS K 6383 (1995).

5. Tensile Strength at Break (Unit: MPa) and Tensile Elongation at Break (Unit: %)

Using a #3 dumb-bell specimen, stress (tensile strength at break) and percentage elongation (tensile elongation at break) when the specimen broke were measured at a tensile rate of 500 mm/min in accordance with JIS K 6251. The higher the tensile strength at break is, and the larger the tensile elongation at break is, the better the durability of a polymer is.

Example 1

(Preparation of Polymer)

A stainless-steel polymerization reactor having an inner volume of 20 liters and equipped with a stirrer was washed and dried, and gas inside the polymerization reactor was replaced with dry nitrogen. Next, 10.2 kg of industrial hexane (density 680 kg/$m^3$), 517 g of 1,3-butadiene, 163 g of styrene, 38 g of limonene, 6.1 ml of tetrahydrofuran, and 4.6 ml of ethylene glycol diethyl ether were introduced into the polymerization reactor. Next, in order to detoxify impurities that function to deactivate the polymerization initiator in advance, a small amount of a hexane solution of n-butyllithium as a scavenger was introduced into the polymerization reactor.

In order to initiate polymerization, a n-hexane solution of n-butyllithium (n-butyllithium content 12.2 mmol) was started to be introduced into the polymerization reactor. The introduction of the n-hexane solution was performed over a period of 1 hour.

The polymerization reaction was performed for 3 hours. During the polymerization reaction, the temperature inside the polymerization reactor was regulated to 65° C., the solution in the polymerization reactor was stirred at a stirring speed of 130 rpm. During the polymerization reaction, 775 g of 1,3-butadiene and 245 g of styrene were continuously supplied to the polymerization reactor.

Next, while maintaining the polymerization reactor temperature at 65° C., the resulting polymerization solution was stirred at a stirring speed of 130 rpm in the polymerization reactor, 12.9 mmol of [3-(diethylamino)propyl]trimethoxysilane was added to the polymerization solution, and stirring was performed for 15 minutes.

20 ml of a hexane solution containing 0.8 ml of methanol was introduced into the polymerization reactor, and the polymer solution was stirred for 5 minutes.

8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityl tetrakis(3-laurylthiopropionate) (trade name: Sumilizer TP-D, manufactured by Sumitomo Chemical Co., Ltd.) were introduced into the polymerization reactor, next, the polymer solution was evaporated at normal temperature for 24 hours and, further, dried under reduced pressure at 55° C. for 12 hours, and a polymer was thus obtained. Evaluation results of the polymer are shown in Table 1.

(Preparation of Polymer Composition)

100 parts by mass of the resulting polymer, 78.4 parts by mass of silica (trade name: Ultrasil VN3-G, manufactured by Degussa), 6.4 parts by mass of a silane coupling agent (trade name: Si69, manufactured by Degussa), 6.4 parts by mass of carbon black (trade name: Diablack N339, manufactured by Mitsubishi Chemical Corporation), 47.6 parts by mass of extender oil (trade name: JOMO Process NC-140, manufactured by Japan Energy Corporation), 1.5 parts by mass of an antiaging agent (trade name: Antigene 3C, manufactured by Sumitomo Chemical Co., Ltd.), 1.5 parts by mass of wax (trade name: Sunnoc N, manufactured by Ouchi Shinko Chemical Industrial Co., Ltd.), and 2 parts by mass of stearic acid were kneaded with a Labo Plastomill, and a polymer composition was thus obtained.

Next, as second-stage kneading, 2 parts by mass of zinc flower, 1.5 parts by mass of a vulcanization accelerator (trade name: Soxinol CZ, manufactured by Sumitomo Chemical Co., Ltd.), 1.5 parts by mass of a vulcanization accelerator (trade name: Soxinol D, manufactured by Sumitomo Chemical Co., Ltd.), and 1.4 parts by mass of sulfur were added to the polymer composition and kneaded with a 6-inch roll, and the kneaded product (the polymer composition) was formed into a sheet.

The sheet was heated at 160° C. for 55 minutes to be vulcanized, and the physical properties of the resulting sheet were evaluated. Evaluation results of the physical properties of the sheet are shown in Table 1.

Example 2

(Preparation of Polymer)

A stainless-steel polymerization reactor having an inner volume of 20 liters and equipped with a stirrer was washed and dried, and gas inside the polymerization reactor was replaced with dry nitrogen. Next, 10.2 kg of industrial hexane (density 680 kg/m$^3$), 517 g of 1,3-butadiene, 163 g of styrene, 38 g of limonene, 6.1 ml of tetrahydrofuran, and 4.6 ml of ethylene glycol diethyl ether were introduced into the polymerization reactor. Next, in order to detoxify impurities that function to deactivate the polymerization initiator in advance, a small amount of a hexane solution of n-butyllithium as a scavenger was introduced into the polymerization reactor.

A n-hexane solution of n-butyllithium (n-butyllithium content 12.2 mmol) was introduced into the polymerization reactor to initiate a polymerization reaction.

The polymerization reaction was performed for 3 hours. During the polymerization reaction, the temperature inside the polymerization reactor was regulated to 65° C., the solution in the polymerization reactor was stirred at a stirring speed of 130 rpm, and 775 g of 1,3-butadiene and 245 g of styrene were continuously supplied to the polymerization reactor.

Next, while maintaining the polymerization reactor temperature at 65° C., the resulting polymerization solution was stirred at a stirring speed of 130 rpm in the polymerization reactor, 0.39 mmol of silicon tetrachloride was added to the polymerization solution, and stirring was performed for 15 minutes. Next, 10.6 mmol of [3-(diethylamino)propyl]trimethoxysilane was added to the polymerization solution, and stirring was performed for 15 minutes.

20 ml of a hexane solution containing 0.8 ml of methanol was introduced into the polymerization reactor, and the polymer solution was stirred for 5 minutes.

8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityl tetrakis(3-laurylthiopropionate) (trade name: Sumilizer TP-D, manufactured by Sumitomo Chemical Co., Ltd.) were introduced into the polymerization reactor. Next, the polymer solution was evaporated at normal temperature for 24 hours and, further, dried under reduced pressure at 55° C. for 12 hours, and a polymer was thus obtained. Evaluation results of the polymer are shown in Table 1.

(Preparation of Polymer Composition)

100 parts by mass of the resulting polymer, 78.4 parts by mass of silica (trade name: Ultrasil VN3-G, manufactured by Degussa), 6.4 parts by mass of a silane coupling agent (trade name: Si69, manufactured by Degussa), 6.4 parts by mass of carbon black (trade name: Diablack N339, manufactured by Mitsubishi Chemical Corporation), 47.6 parts by mass of extender oil (trade name: JOMO Process NC-140, manufactured by Japan Energy Corporation), 1.5 parts by mass of an antiaging agent (trade name: Antigene 3C, manufactured by Sumitomo Chemical Co., Ltd.), 1.5 parts by mass of wax (trade name: Sunnoc N, manufactured by Ouchi Shinko Chemical Industrial Co., Ltd.), and 2 parts by mass of stearic acid were kneaded with a Labo Plastomill, and a polymer composition was thus obtained.

Next, as second-stage kneading, 2 parts by mass of zinc flower, 1.5 parts by mass of a vulcanization accelerator (trade name: Soxinol CZ, manufactured by Sumitomo Chemical Co., Ltd.), 1.5 parts by mass of a vulcanization accelerator (trade name: Soxinol D, manufactured by Sumitomo Chemical Co., Ltd.), and 1.4 parts by mass of sulfur were added to the polymer composition and kneaded with a 6-inch roll, and the kneaded product (the polymer composition) was formed into a sheet.

The sheet was heated at 160° C. for 55 minutes to be vulcanized, and the physical properties of the resulting sheet were evaluated. Evaluation results of the physical properties of the sheet are shown in Table 1.

[Comparative Example 1]

(Preparation of Polymer)

A stainless-steel polymerization reactor having an inner volume of 20 liters and equipped with a stirrer was washed and dried, and gas inside the polymerization reactor was replaced with dry nitrogen. Next, 10.2 kg of industrial hexane (density 680 kg/m$^3$), 517 g of 1,3-butadiene, 163 g of styrene, 6.1 ml of tetrahydrofuran, and 4.6 ml of ethylene glycol diethyl ether were introduced into the polymerization reactor. Next, in order to detoxify impurities that function to deactivate the polymerization initiator in advance, a small amount of a hexane solution of n-butyllithium as a scavenger was introduced into the polymerization reactor.

A n-hexane solution of n-butyllithium (n-butyllithium content 11.4 mmol) was introduced into the polymerization reactor to initiate a polymerization reaction.

The polymerization reaction was performed for 3 hours. During the polymerization reaction, the temperature inside the polymerization reactor was regulated to 65° C., the solution in the polymerization reactor was stirred at a stirring speed of 130 rpm, and 775 g of 1,3-butadiene and 245 g of styrene were continuously supplied to the polymerization reactor.

Next, while maintaining the polymerization reactor temperature at 65° C., the resulting polymerization solution was stirred at a stirring speed of 130 rpm in the polymerization reactor, 11.4 mmol of [3-(diethylamino)propyl]trimethoxysilane was added to the polymerization solution, and stirring was performed for 15 minutes.

20 ml of a hexane solution containing 0.8 ml of methanol was introduced into the polymerization reactor, and the polymer solution was stirred for 5 minutes.

8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityl tetrakis(3-laurylthiopropionate) (trade name: Sumilizer TP-D, manufactured by Sumitomo Chemical Co., Ltd.) were introduced into the polymerization reactor. Next, the polymer solution was evaporated at normal temperature for 24 hours and, further, dried under reduced pressure at 55° C. for 12 hours, and a polymer was thus obtained. Evaluation results of the polymer are shown in Table 1.

(Preparation of Polymer Composition)

100 parts by mass of the resulting polymer, 78.4 parts by mass of silica (trade name: Ultrasil VN3-G, manufactured by Degussa), 6.4 parts by mass of a silane coupling agent (trade name: Si69, manufactured by Degussa), 6.4 parts by mass of carbon black (trade name: Diablack N339, manufactured by Mitsubishi Chemical Corporation), 47.6 parts by mass of extender oil (trade name: JOMO Process NC-140, manufactured by Japan Energy Corporation), 1.5 parts by mass of an antiaging agent (trade name: Antigene 3C, manufactured by Sumitomo Chemical Co., Ltd.), 1.5 parts by mass of wax (trade name: Sunnoc N, manufactured by Ouchi Shinko Chemical Industrial Co., Ltd.), and 2 parts by mass of stearic acid were kneaded with a Labo Plastomill, and a polymer composition was thus obtained.

Next, as second-stage kneading, 2 parts by mass of zinc flower, 1.5 parts by mass of a vulcanization accelerator (trade name: Soxinol CZ, manufactured by Sumitomo Chemical Co., Ltd.), 1.5 parts by mass of a vulcanization accelerator (trade name: Soxinol D, manufactured by Sumitomo Chemical Co., Ltd.), and 1.4 parts by mass of sulfur were added to the polymer composition and kneaded with a 6-inch roll, and the dough (the polymer composition) was formed into a sheet.

The sheet was heated at 160° C. for 55 minutes to be vulcanized, and the physical properties of the resulting sheet were evaluated. Evaluation results of the physical properties of the sheet are shown in Table 1.

TABLE 1

|  | Example 1 | Example 2 | Comp. Example 1 |
|---|---|---|---|
| Physical properties of polymer |  |  |  |
| Mooney viscosity | 40 | 38 | 39 |
| Mz/Mn | 2.05 | 2.53 | 1.46 |
| Amount of vinyl bonds (mol %) | 55 | 58 | 58 |

TABLE 1-continued

|  | Example 1 | Example 2 | Comp. Example 1 |
|---|---|---|---|
| Amount of styrene unit (mass %) | 25 | 25 | 25 |
| Physical properties of sheet |  |  |  |
| Tensile strength at break (MPa) | 16.7 | 16.2 | 15.0 |
| Tensile elongation at break (%) | 360 | 360 | 345 |

Example 3

Performing the same procedure as Example 1 except for using terpinene in place of limonene in Example 1 provides a corresponding polymer and polymer composition containing the polymer.

Example 4

Performing the same procedure as Example 1 except for using terpinolene in place of limonene in Example 1 provides a corresponding polymer and polymer composition containing the polymer.

The invention claimed is:

1. A method for manufacturing a conjugated diene polymer comprising a conjugated diene as a monomeric unit, the method comprising:
   a step of producing the conjugated diene polymer by a polymerization reaction in a polymerization solution comprising the conjugated diene, at least one compound selected from the group consisting of limonene, terpinene, and terpinolene, and an organoalkali metal compound as a polymerization initiator,
   Mz/Mn being 1.7 or more and 4.0 or less, when Mz is a Z-average molecular weight of the conjugated diene polymer, Mn is a number average molecular weight of the conjugated diene polymer, and the Z-average molecular weight and the number average molecular weight are values in terms of polystyrene by gel permeation chromatography,
   wherein a Mooney viscosity ($ML_{1+4}$) of the conjugated diene polymer is 10 or more and 200 or less.

2. The method according to claim 1, wherein a total content of limonene, terpinene, and terpinolene in the polymerization solution is 0.5 mol or more and 40 mol or less per mol of an alkali metal in the organoalkali metal compound.

3. The method according to claim 1, further comprising a step of introducing a modifying group derived from at least one compound selected from the group consisting of alkoxysilane compounds, halogen-containing silicon compounds, ketone compounds, and tin compounds into a terminal of the polymer produced by the polymerization reaction.

4. The method according to claim 1, wherein the organoalkali metal compound is supplied to the polymerization solution in a divided or continuous manner during the polymerization reaction.

* * * * *